Aug. 26, 1952 L. J. VON GUNTEN 2,608,622

TELEPHONE DESK SET

Filed July 26, 1948

INVENTOR:
LEO J. VON GUNTEN
BY
Gordon C. Clark
ATTORNEY

Patented Aug. 26, 1952 2,608,622

UNITED STATES PATENT OFFICE 2,608,622

TELEPHONE DESK SET

Leo J. Von Gunten, Akron, Ohio

Application July 26, 1948, Serial No. 40,691

1 Claim. (Cl. 179—146)

This invention relates to a telephone desk set which, in addition to the usual holder for the receiver, has another rest or holder for the receiver which is to be used when it is desired to keep the circuit open. The invention includes a desk set with such a holder, and also a holder which is to be used in combination with an ordinary desk set.

It often happens, and especially in business conversations, that a person using a telephone wishes to lay the receiver down without closing the telephone circuit. The additional rest or holder of this invention is provided for use at such times. It holds the receiver ready for further use without breaking the telephone connection.

The drawings illustrate various embodiments of the invention.

Figure 1:
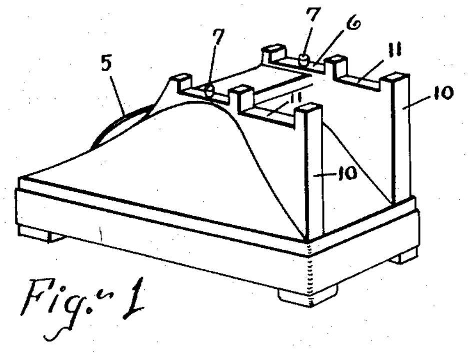
Fig. 1 is a view in perspective of an ordinary desk set with the added holder of this invention immediately behind the holder usually provided.
Figure 3:
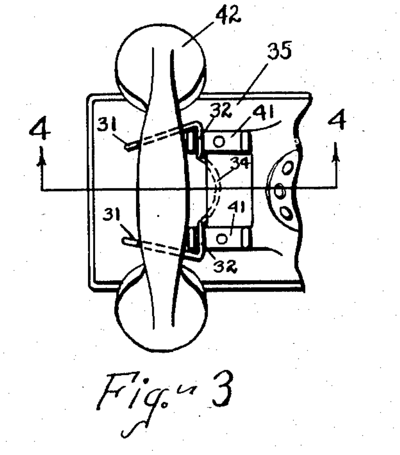
Fig. 3 is a plan view of an ordinary desk set, partly broken away, with a wire holder attached.

In Fig. 1 an ordinary desk set is shown with a dial 5 on the front face. At the top of the set is the ordinary rest or holder 6, with the buttons 7 which are depressed when the receiver is placed in the holder, thereby cutting off the telephone circuit.

The ordinary desk set is molded of any suitable plastic. In the desk set shown in Fig. 1 added supports 10 are molded as a continuation of the supports which form the holder 6, forming the additional holder or rest 11. With such a desk set the telephone receiver will be placed on the holder 6 when the telephone is not in use. When a call is made, the receiver will be lifted from the holder 6, the buttons 7 will be pressed up, the telephone circuit will be open and the instrument may be used in the ordinary manner. At any time during the conversation when the party using the phone wishes to lay the receiver down in order to locate certain information, or leave the phone to answer another call, or for any other reason, he places the receiver in the added holder

11. This does not disconnect the telephone circuit. When he desires to complete the conversation he lifts the receiver from this position and uses it in the ordinary manner. Then when the telephone conversation has been completed the receiver is returned to the holder 6. This breaks the telephone circuit.

Figure 2:
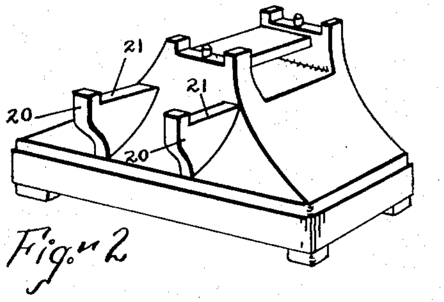
Fig. 2 is a view in perspective of an ordinary desk set with the added holder arranged at the side thereof.

In the desk set shown in Fig. 2, instead of the holder 11 being molded behind the holder 6, the two arms 20 are molded at the side of the desk set, forming the holder 21. This holder is used in the same manner as the holder 11 in Fig. 1.

Figure 4:
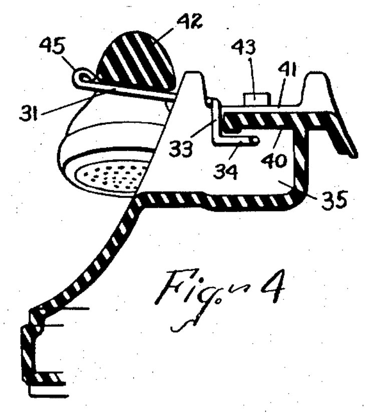
Fig. 4 is a section on line 4—4 of Fig. 3.
Figure 7:
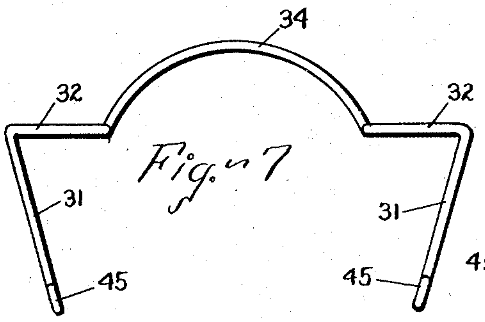
Figs. 7 and 8 are a plan and end view, respectively, of the wire used in making the holder.
Figure 8:
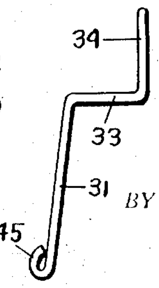

In a preferred form of the invention the added rest or holder is not molded as a part of the desk set, but is formed of a stiff wire. Figs. 7 and 8 show how the wire is bent for this use. The two arms 31 may be parallel or they may slant inward or outward. In the drawings they are shown as slanting inward toward one another. They are extensions of the two short arms 32 which are in alignment. The short perpendicular connections 33 (Fig. 4) extending downward from these arms connect with the ends of the arc 34.

Figure 5:
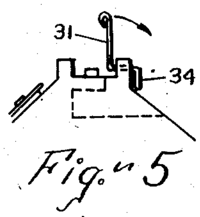
Figs. 5 and 6 illustrate the method of placing this holder on a desk set.
Figure 6:
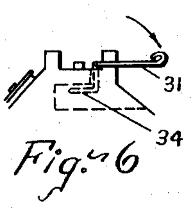

This holder is used with an ordinary desk set 35. This desk set is formed in the usual way with a shelf-like portion 40 just below the usual holder or rest 41. When the receiver 42 is placed in the holder 41, and when it is lifted from this holder it operates the buttons 43 which open and close the telephone circuit. The holder of this invention is placed on the desk set in the manner shown in Figs. 5 and 6. The portions 32 are placed at the back edge of the holder 41 and the arc 34 is then turned down under the shelf portion 40. When the receiver is placed on the arms 31 the shelf 40 prevents the arms 33 from swinging forward and the arc portion 34 from swinging upward. The holder is preferably made of spring wire and formed in such a manner that the vertical arms 33 press outwardly against the arms 41 to keep the holder in place. The loops 45 at the outer end of each arm 31 keep the receiver from sliding off of the holder.

Figure 9:
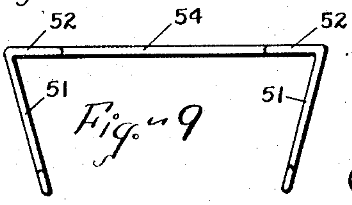
Figs. 9 and 10 are a plan and end view, respectively, of a modified holder.
Figure 10:
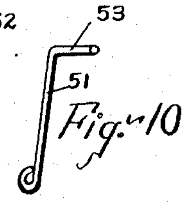

The wire need not be formed with an arc portion, but the arms 51 may extend outward from the two short arms 52 as shown in Figs. 9 and 10, with the vertical arms 53 connected at their lower end by the straight portion 54. In this form of the invention the weight of the receiver on the arms 51 presses the arm 54 or the vertical arms 53 against the back portion of the shelf part 40. If the wire is of stiff spring material the outward pressure of the arms 53 against the molded arms 41 may be sufficient to hold the spring in place. In any such manner, the weight of the receiver is prevented from dislodging the holder from the desk set.

Thus the invention may be embodied in different forms. In the preferred form the added rest or holder is formed of wire which is preferably sprung into position and which may thereafter be dislodged at will.

Modifications may be made in the specific embodiments shown and claimed without departing from the scope of the claim which follows.

What I claim is:

A wire holder for a telephone desk set having a shelf immediately below two rests for the receiver, which holder is formed of a single piece of wire bent to form two terminal arm portions extending in the same general direction for holding the receiver, and extending inwardly from these terminal arm portions two short portions in alignment with one another and adapted to rest on said rests of the desk set, from the inner ends of these short portions two short portions extending perpendicularly downwardly with respect to the terminal arm portions and an arc portion connecting said downwardly extending portions, which arc portion is in a plane substantially parallel to the plane of the two terminal portions and is bent away from the terminal portions and is adapted to hook under the shelf.

LEO J. VON GUNTEN.

REFERENCES CITED

The following references are of record in the file of this patent:

UNITED STATES PATENTS

| Number | Name | Date |
|---|---|---|
| 926,798 | Wilson | July 6, 1909 |
| 2,320,838 | Watson | June 1, 1943 |

FOREIGN PATENTS

| Number | Country | Date |
|---|---|---|
| 438,548 | Germany | Apr. 29, 1925 |